(12) United States Patent
Rossi

(10) Patent No.: US 6,196,372 B1
(45) Date of Patent: Mar. 6, 2001

(54) BODY HANDLING AND ASSEMBLY SYSTEM

(75) Inventor: Cristiano Rossi, Baldissero Torinese (IT)

(73) Assignee: Fata Automation S.p.A., Pianezza (IT)

( * ) Notice: Subject to any disclaimer, the term of this patent is extended or adjusted under 35 U.S.C. 154(b) by 0 days.

(21) Appl. No.: 09/247,331

(22) Filed: Feb. 10, 1999

(30) Foreign Application Priority Data

Feb. 11, 1998 (IT) .............................................. MI98A0254

(51) Int. Cl.[7] .................................................. B65G 47/22
(52) U.S. Cl. .................................... 198/345.1; 198/345.3
(58) Field of Search ............................ 198/345.1, 345.2, 198/345.3

(56) References Cited

U.S. PATENT DOCUMENTS

| | | | |
|---|---|---|---|
| 4,924,996 | * 5/1990 | Svensson et al. | 198/345.1 X |
| 5,191,958 | * 3/1993 | Tolocko | 198/345.1 X |
| 5,313,695 | * 5/1994 | Negre et al. | 198/345.3 X |

FOREIGN PATENT DOCUMENTS 0213033  3/1987  (EP) .

64-43415  * 2/1989  (JP) ................................. 198/345.3

OTHER PUBLICATIONS

Patent Abstracts of Japan, vol. 10, No. 40, Feb. 18, 1986, JP 60 191912 A (Toyota Shiyatai KK), Sep. 30, 1985.

* cited by examiner

*Primary Examiner*—James R. Bidwell
(74) *Attorney, Agent, or Firm*—Jacobson, Price, Holman & Stern, PLLC

(57) ABSTRACT

A body assembly system with work stations and a body handling device between work stations includes reference members mounted in an adaptable manner and handling device for supporting the body on the handling device during movement between work stations. The system also includes grasping devices mounted in the work stations for grasping the reference members and positioning them accurately while disengaging them temporarily from the handling device in such a manner as to position the body supported on the reference members accurately in the station space. The reference members are advantageously provided in the form of vertical pins ending below in a ball graspable by the grasping devices to raise the pins from resting on the handling device.

11 Claims, 2 Drawing Sheets

BODY HANDLING AND ASSEMBLY SYSTEM

BACKGROUND OF THE INVENTION

The present invention related to a station and a body assembly system.

In the prior art there are systems and assembly stations for welding automotive vehicle bodies and the like in which programmable robots apply welding spots in formation stations (termed 'geometry') and in subsequent completion stations for finishing.

These systems generally include a plurality of handling pallets each provided with centering pins on which is positioned the lower surface of a preassembled body made up of a series of pressed sheet metal panels. The pallet comprises a series of locking members for holding the body in the predetermined position. Usually the pallet comprises series of reference pins fixed to the pallet structure and on which the body is rested. A handling system supports the pallets and moves them along a line which passes through one or more welding stations.

Each welding station includes a series of programmable robots which perform the welding operations and fixed equipment which hold the members transported on the pallet in position during welding.

One disadvantage of the systems described is that the body is positioned on the pallet to be referred to it accurately. The pallet in turn must be positioned accurately with respect to the fixed equipment. As a result the body is positioned with respect to the fixed equipment indirectly through the pallet structure. The necessity of having to provide very accurate pallet structures involves high costs since the pallets are used in large quantities.

In addition, as the dimensional accuracy of the pallets can vary the body positioning accuracy can vary also. This can influence both the quality of the welding and repeatability with harmful effects on final product quality.

Another disadvantage is that the pallet handling and repositioning devices must be kept in good condition to prevent pallet positioning accuracy variation.

The general purpose of the present invention is to obviate the above mentioned drawbacks by making available an assembly system and stations in which pallet production accuracy would not influence the positioning accuracy of the bodies born on the pallets. In addition a further purpose is to make available an assembly system and stations which would not need accurate pallet or handling system positioning and would allow variability between individual pallets and handling systems. Another purpose is to avoid the need for continuously keeping assembly system components such as the pallet or handling systems in optimal condition to ensure body positioning accuracy in the stations.

SUMMARY OF THE INVENTION

In view of these purposes in accordance with the present invention it is sought to provide a body assembly system with work stations and body handling means between work stations comprising reference members mounted in a adaptable manner on handling means for supporting the body on the handling means during movement between work stations and grasping devices mounted in the work stations for grasping the reference members and positioning them accurately while disengaging them temporarily from the handling means in such a manner as to position the body supported on the reference members accurately in the station space.

BRIEF DESCRIPTION OF THE DRAWINGS

To clarify the explanation of the innovative principles of the present invention and its advantages compared with the prior art there is described below with the aid of the annexed drawings a possible embodiment thereof by way of non-limiting example applying said principles. In the drawings.

DETAILED DESCRIPTION OF THE INVENTION

Figure 1:
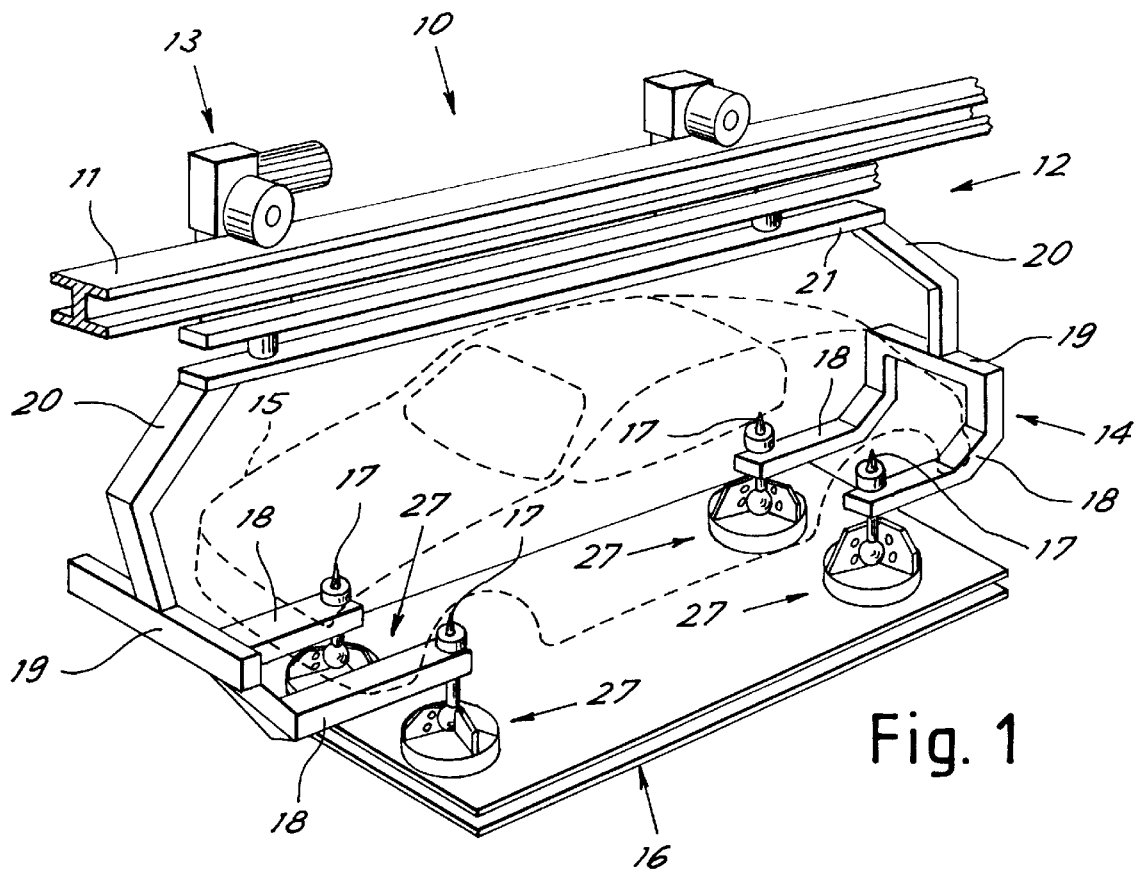
FIG. 1 shows a diagrammatic perspective view of a system in accordance with the present invention comprising a work cell or station.

With reference to the figures, FIG. 1 shows a partial view of a system indicated as a whole by reference number 10 comprising a handling system made up of a rail 11 on which run conveyors or handling means 12. The conveyors or self-movers comprise motor drives 13 running along the rail and bearing hangers 14 for support of bodies 15 to be processed (typically welding). The hanger conveyors carry the bodies between a plurality of work stations or cells of which one indicated by reference number 16 is shown in FIG. 1.

A similar handling system is known in its general lines and therefore will not be further described or shown. In accordance with the innovative principles of the present invention the hanger 14 comprises supports or reference members 17 on which is rested the body to be handled. As an example the supports 17 are placed on four arms 18 generally L-shaped and arranged in pairs at the front and rear. Each pair is supported by a respective overturned T beam 19 having an arm 20 for fixing to a longitudinal upper beam 21 of the self-mover.

As clarified below in accordance with the present invention the supports 17 are positioned in an adaptable manner on the hanger. Holding and reference devices 27 are located in the work station 16 for grasping the supports 17 of the body and moving them from the rest position on the hanger to a position (accurately determined by the holding devices) that is for accurate positioning of the body in the work station. In this manner during moving of the body between work stations the supports 17 are supporting for handling with no need of great positioning accuracy. During the operation phase in the station the supports are disengaged from the handling unit and positioned accurately by means of devices 27 in the station to become accurate positioning supports for the body with respect to the station.

Figure 2:
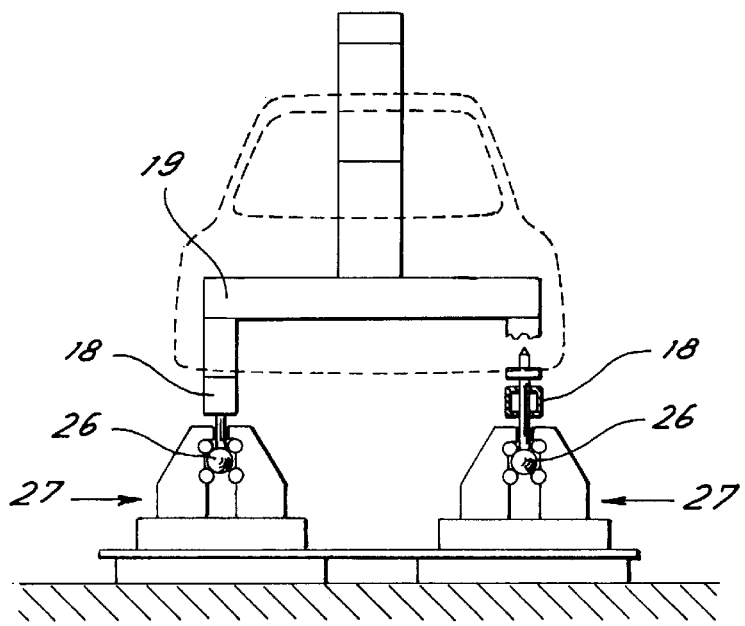
FIG. 2 shows a partial front elevation view of the work cell of FIG. 1.
Figure 3:
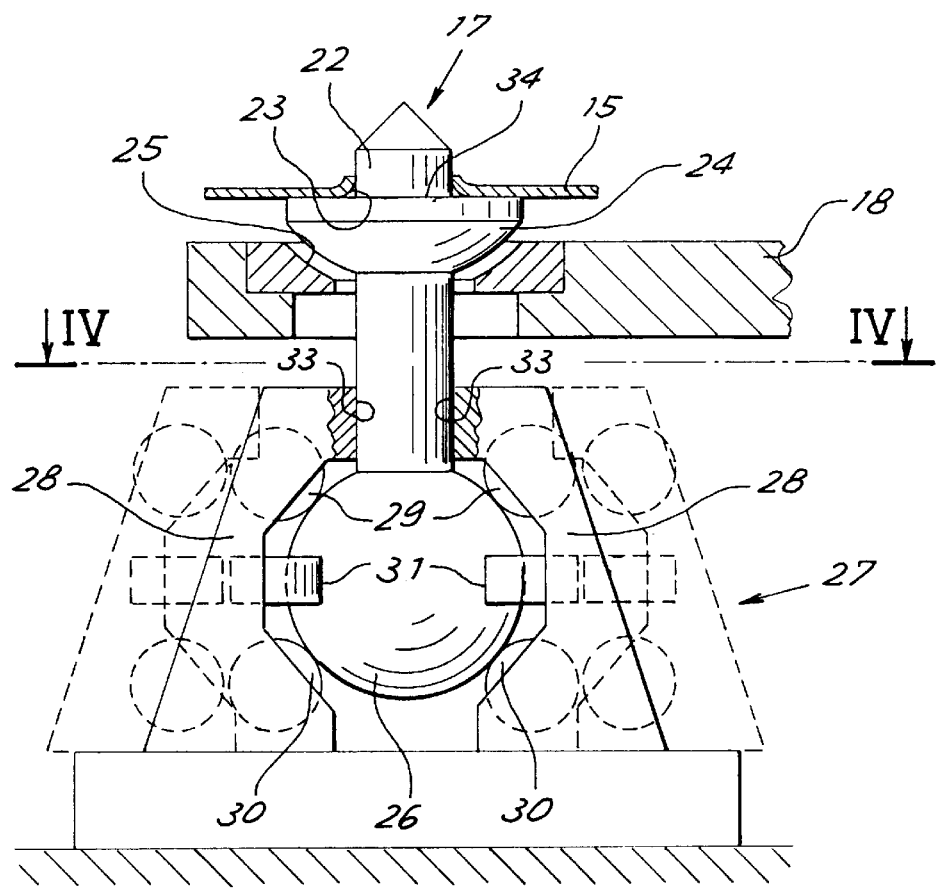
FIG. 3 shows an elevation view of a reference pin and associated locking unit.
Figure 4:
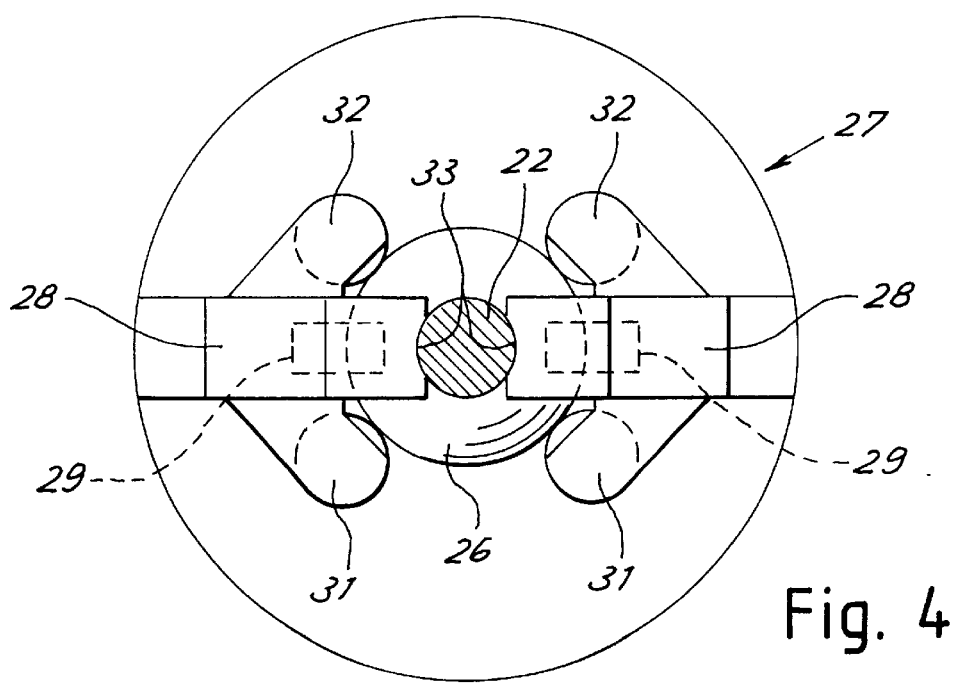
FIG. 4 is a plan view of the reference pin and the associated locking unit of FIG. 3.

As may be seen better in FIGS. 2 and 3 in the preferred embodiment each support 17 includes a positioning pin 22 which is vertical and has its upper end tapered (e.g. conical) designed to fit accurately in an appropriate reference seat 23 in the body 15. The part of the pin which is received in the seat can be e.g. cylindrical or lozenge-shaped.

Just under the cylindrical or lozenge-shaped part of the reference pin 22 is mounted a hemispherical fifth wheel 24 for adaptable support in a complementary seat 25 present in the respective arm 18 of the hanger. The top surface of the fifth wheel provides a plane or disk 34 for supporting the body. The pin 22 continues downward beyond the set 25 and ends with a ball 26 which defines spherical grasping surfaces. During handling operations the fifth wheel 24 is rested in the seat 25 and the body is supported on the hanger.

The holding devices 27 are provided with movable jaws 28 (powered for moving between the broken line position and the solid line position of FIG. 3) which are designed to close around the lower spherical end of a respective support 17 for raising the support from the seat 25 and positioning it accurately with respect to the work station.

For this purpose each jaw comprises rollers or bearings for contact with the ball 26 for accurately positioning its center. In the preferred embodiment shown each jaw comprises a pair of rollers or bearings 29 and 30 arranged in a vertical plane and two bearings or rollers 31, 32 arranged in a horizontal plane. For example the bearings 29, 30 are arranged over and under the equatorial diameter of the ball and the bearings 31, 32 are arranged side by side in intermediate position between the rollers or bearings 29, 30.

To accurately lock rotation of the ball 26 also and thus accurately position the point of the pin 22 the jaws have. ends 33 for grasping the cylindrical body of the pin and constitute reaction means for angular positioning of the reference member 17 around the center of the ball to define the axis.

During operation of the system when the locking devices are in open position the hanger with the reference pins 17 is free to pass through the work station or cell. When required the handling system will stop the hanger inside a cell 16 with a positioning tolerance common to handling systems with self-mover, for example +−20 mm so that the balls 26 are inside the area circumscribed by the jaws of the locking devices 27.

Before starting the body work cycle the locking and positioning devices holding devices 27 close the jaws 28 on the balls of the respective pins 17 to bring the bearings 29, 31 against the balls. The closing jaws cause the bearings to roll on the surface of the balls which rise until they are positioned with the desired accuracy inside the locking devices. The ends 33 of the jaws lock the pins to prevent rotation of the ball.

The bearings eliminate drag wear.

The pins 22 are thus freed from the hanger and positioned with the desired accuracy for the operations to be performed in the cell.

At this point the work equipment such as e.g. welding robots or other (not shown since of any known type readily imaginable for one skilled in the art) can begin their work on the body which will always be accurately located in the same position.

It is now clear that the preset purposes have been achieved by providing an installation with an accurate positioning system not dependent on the construction and positioning tolerances of the handling means.

Naturally the above description of an embodiment applying the innovative principles of the present invention is given by way of non-limiting example of said principles within the scope of the exclusive right claimed here. For example the handling means could be formed differently from that shown depending on specific requirements. Each grasping device could have two or three jaws.

What is claimed is:

1. Body assembly system with work stations and body handling means between work stations comprising:

reference members mounted on the handling means for supporting the body on the handling means during movement between work stations, and grasping devices mounted in the work stations for grasping the reference members supporting the body and positioning the reference members accurately while disengaging the reference members temporarily from the handling means to accurately position the body supported on the reference members in the work station.

2. System in accordance with claim 1 characterized in that the reference members comprise a supporting zone for the body above and an intermediate area for support of the member on the handling means and a lower zone with spherical surface with the grasping device comprising jaws moving between an open position for free passage of the reference member and a closed position for grasping the spherical surface for raising the intermediate support zone and accurate positioning of the spherical surface curvature center with the jaws also comprising reaction means acting against the reference members upon closing of the jaws for accurate angular positioning of the member around the spherical surface center.

3. System in accordance with claim 2 characterized in that the body support zone comprises a vertical cylindrical part with tapered end for passage into a purposeful seat in the body and a horizontal disk for support of the body.

4. System in accordance with claim 2 characterized in that the intermediate support zone for the member on the handling means comprises a fifth wheel which is hemispherical below and rests in a complementary seat in the handling means.

5. System in accordance with claim 2 characterized in that the reaction means of the jaws comprise ends of the jaws which rest on the part of the member which connects the lower grasping zone and the intermediate support zone.

6. System in accordance with claim 2 characterized in that the jaws have bearings for contact with the spherical surface.

7. System in accordance with claim 6 characterized in that for each jaw the bearings are two in a horizontal plane and two in a vertical plane.

8. System in accordance with claim 2 characterized in that the reference member is made up of a pin arranged vertically with its upper end for support of the body and its lower end spherical for its grasping by the grasping devices.

9. System in accordance with claim 1 characterized in that the handling means comprise a hanger suspended from a self-mover carriage running on a suspended rail with the hanger having horizontal arms at the ends of which are located the reference members on which rests the body.

10. Body welding system including a hanger for movement of a preassembled body to a work cell comprising:

a series of horizontal arms connected to the hanger and suspended through the hanger over a support surface, reference pins mounted on said horizontal arms to support the body in spatial relation with respect to the hanger, and special clamps mounted on the support surface to accurately position and release the reference pins with respect to the support surface independently of the handling hanger to directly position the body in the work cell.

11. System in accordance with claim 10 characterized in that the pins have their upper part pointed or lozenge-shaped and ending in a supporting plane for the body and a cylindrical lower part connected to a spherical part and the special clamps comprise jaws moving between an open and a closed position to lock or release through contact with bearings the lower part of the pins which directly position the body in the work cell accurately.

* * * * *